United States Patent
Davydov et al.

(10) Patent No.: US 9,497,218 B1
(45) Date of Patent: Nov. 15, 2016

(54) SYSTEM AND METHOD FOR DETECTION OF PHISHING SCRIPTS

(71) Applicant: AO Kaspersky Lab, Moscow (RU)

(72) Inventors: Vasily A. Davydov, Moscow (RU); Anton M. Ivanov, Moscow (RU); Roman Y. Gavrilchenko, Moscow (RU); Dmitry V. Vinogradov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/062,715

(22) Filed: Mar. 7, 2016

(30) Foreign Application Priority Data

Sep. 30, 2015 (RU) ................................ 2015141553

(51) Int. Cl.
*G06F 11/00* (2006.01)
*H04L 29/06* (2006.01)

(52) U.S. Cl.
CPC ................................ *H04L 63/1483* (2013.01)

(58) Field of Classification Search
CPC .................................................. H04L 63/1483
USPC ..................................................... 726/22–25
See application file for complete search history.

(56) References Cited

U.S. PATENT DOCUMENTS

| | | | |
|---|---|---|---|
| 8,448,245 B2 | 5/2013 | Banerjee et al. | |
| 9,118,703 B2 | 8/2015 | Topan et al. | |
| 2008/0172741 A1* | 7/2008 | Reumann | H04L 63/1483 726/23 |
| 2011/0030058 A1* | 2/2011 | Ben-Itzhak | G06F 21/51 726/24 |
| 2011/0225142 A1* | 9/2011 | McDonald | G06F 21/552 707/710 |
| 2011/0289582 A1* | 11/2011 | Kejriwal | G06F 21/566 726/22 |
| 2012/0222117 A1* | 8/2012 | Wong | H04L 63/02 726/23 |
| 2013/0007882 A1* | 1/2013 | Devarajan | H04L 63/1416 726/24 |
| 2013/0086681 A1* | 4/2013 | Jaroch | G06F 21/566 726/23 |
| 2013/0097706 A1* | 4/2013 | Titonis | G06F 21/56 726/24 |
| 2015/0067839 A1* | 3/2015 | Wardman | G01F 11/262 726/22 |
| 2015/0096023 A1 | 4/2015 | Mesdaq et al. | |
| 2015/0242605 A1* | 8/2015 | Du | G06F 21/32 726/7 |

OTHER PUBLICATIONS

Shahriar et al., "PhishTester: Automatic Testing of Phishing Attacks," Secure Software Integration and Reliability Improvement (SSIRI), 2010 Fourth International Conference on Year: 2010 pp. 198-207.*

Salem et al., "Awareness Program and AI based Tool to Reduce Risk of Phishing Attacks," Computer and Information Technology (CIT), 2010 IEEE 10th International Conference on Year: 2010 pp. 1418-1423.*

* cited by examiner

*Primary Examiner* — Roderick Tolentino
(74) *Attorney, Agent, or Firm* — Arent Fox LLP; Michael Fainberg (57) ABSTRACT

Disclosed are exemplary aspects of systems and methods for detection of phishing scripts. An exemplary method comprises: generating a bytecode of a script; computing a hash sum of the generated bytecode; determining a degree of similarity between the hash sum of the bytecode and hash sums in one or more groups of hash sums of known phishing scripts; identifying at least one group of hash sums that contains a hash sum whose degree of similarity with the hash sum of the bytecode is within a threshold; determining a coefficient of compactness of the identified group of hash sums and a coefficient of trust of the identified group of hash sums; and determining whether the script is a phishing script based on the degree of similarity, the coefficient of compactness and the coefficient of trust.

18 Claims, 6 Drawing Sheets

SYSTEM AND METHOD FOR DETECTION OF PHISHING SCRIPTS

CROSS-REFERENCE TO RELATED APPLICATIONS

The present disclosure claims benefit of priority under 35 U.S.C. 119(a)-(d) to a Russian Application No. 2015141553 filed on Sep. 30, 2015, which is incorporated by reference herein.

FIELD OF TECHNOLOGY

The present invention relates generally to the field of computer security, and, more specifically, to systems and methods for detection of phishing scripts.

BACKGROUND

The vigorous development of Internet technologies in the past decade, the advent of a large number of devices transmitting data via the Internet (such as personal computers, notebooks, tablets, mobile telephones, and so on), and also the ease and convenience of their use has led to a large number of people using the Internet in their daily affairs, whether to obtain information, access bank accounts, make purchases, read email, visit social networks, for entertainment, and so on. Often when working on the Internet (such as when purchasing goods, transferring money, accessing website requiring registration, and so on) the users need to transmit their confidential information to external servers (such as credit card and bank account numbers, passwords to account records, and so on), the very information on the safety of which the financial security of the users depends.

The tremendous number of users of the Internet has become a motive for increased activity of hackers, who gain access through various techniques and methods to the confidential information of the users in order to steal data for further use for their own purposes. One of the most popular methods is the so-called phishing, i.e., gaining access to confidential information of a user by sending out messages in the name of popular brands, personal messages within various services (such as social networks or instant messaging systems), and also creating and registering with search services of sites that claim to be the legitimate sites of banks, Internet magazines, social networks, and so on. The email or message sent by the hackers to users often contains links to malicious sites that are externally indistinguishable from the real ones, or to sites from which a transfer to malicious sites will occur. After the user ends up on the counterfeit site, the hackers use various social engineering methods and try to encourage the user to enter his or her confidential information, used for access to a particular site, which lets the hackers gain access to bank accounts and other accounts. Besides a onetime revelation of their confidential information, the users risk downloading from such a counterfeit site one of the malware applications carrying out a regular collection of information from the victim computer and transmittal to the hackers.

In order to deal with the above-described hacking method, technologies are used to reveal phishing messages (such as in email) and also counterfeit sites. For this, a search is performed in the messages for data used for phishing (such as characteristic images, message formation techniques, especially scripts contained in messages, and so forth), for which libraries of trusted and untrusted addresses of sites, phrasing templates from phishing messages, and so forth are used. One of the examples of the above-described approach is to search for data being used for phishing by similarity of signatures or logs of behavior with previously found data used for phishing. Upon discovering the presence of a suspicious object, the user is informed of the potential danger.

Although the above-described methods are good at solving certain problems in the area of detecting phishing (especially phishing scripts) on the basis of an analysis of known phishing methods and types of data used for phishing, they are often no help with new approaches to the use of phishing, or new types of data used for phishing.

SUMMARY

Disclosed are systems and method for detection of phishing scripts. In one exemplary aspect, a method comprising: generating, by a hardware processor, a bytecode of a script; computing, by the hardware processor, a hash sum of the generated bytecode; determining, by the hardware processor, a degree of similarity between the hash sum of the bytecode and hash sums in one or more groups of hash sums of known phishing scripts; identifying, by the hardware processor, at least one group of hash sums that contains a hash sum whose degree of similarity with the hash sum of the bytecode is within a threshold; determining, by the hardware processor, a coefficient of compactness of the identified group of hash sums and a coefficient of trust of the identified group of hash sums; and determining, by the hardware processor, whether the script is a phishing script based on the degree of similarity, the coefficient of compactness and the coefficient of trust.

In one exemplary aspect, the bytecode includes at least one opcode of the script.

In one exemplary aspect, generating a bytecode of the script includes: identifying, by the hardware processor, script commands responsible for functions of writing of data to disk, working with objects of file system and execution of programs; grouping, by the hardware processor, the identified script commands into a plurality of functional groups based on their identified functions; assigning, by the hardware processor, a binary value to each functional group; and generating, by the hardware processor, the bytecode from the binary values.

In one exemplary aspect, a hash sum includes a fuzzy hash.

In one exemplary aspect, searching for matching hash sums includes fuzzy searching.

In one exemplary aspect, determining a coefficient of compactness and a coefficient of trust of the identified group of hash sums, further includes: determining an index of the identified group of hash sums, wherein the index indicates how much the coefficient of trust depends on the coefficient of compactness of the identified group of hash sums.

In one exemplary aspect, a system for detection of phishing scripts comprises: a hardware processor configured to: generate a bytecode of a script; compute a hash sum of the generated bytecode; determine a degree of similarity between the hash sum of the bytecode and hash sums in one or more groups of hash sums of known phishing scripts; identify at least one group of hash sums that contains a hash sum whose degree of similarity with the hash sum of the bytecode is within a threshold; determine a coefficient of compactness of the identified group of hash sums and a coefficient of trust of the identified group of hash sums; and determine whether the script is a phishing script based on the degree of similarity, the coefficient of compactness and the coefficient of trust.

In one exemplary aspect, a non-transitory computer readable medium storing computer executable instructions for detection of phishing scripts includes instructions for: generating a bytecode of a script; computing a hash sum of the generated bytecode; determining a degree of similarity between the hash sum of the bytecode and hash sums in one or more groups of hash sums of known phishing scripts; identifying at least one group of hash sums that contains a hash sum whose degree of similarity with the hash sum of the bytecode is within a threshold; determining a coefficient of compactness of the identified group of hash sums and a coefficient of trust of the identified group of hash sums; and determining whether the script is a phishing script based on the degree of similarity, the coefficient of compactness and the coefficient of trust.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION OF EXEMPLARY ASPECTS

Example aspects of the present invention are described herein in the context of a system, method, and computer program product for detection of phishing scripts. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Some definitions and concepts used in the following description will be introduced first.

A phishing script may be a script containing data used for phishing, said script being able to cause harm to a computer or to data of the computer user. The harm caused may be illegitimate access to computer resources, including data being stored on the computer, for purposes of theft, and also illegitimate use of resources, including to store data, perform calculations, and so on.

A trusted script may be a script which does not cause harm to the computer or its user. A trusted script can be considered to be a script developed by a trusted software manufacturer, downloaded from a trusted source (such as a site entered in the library of trusted sites), or a script whose identifier (such as the MD5 of the script file) is stored in a library of trusted scripts. The identifier of the manufacturer, such as a digital certificate, can also be stored in the library of trusted scripts.

Figure 1:
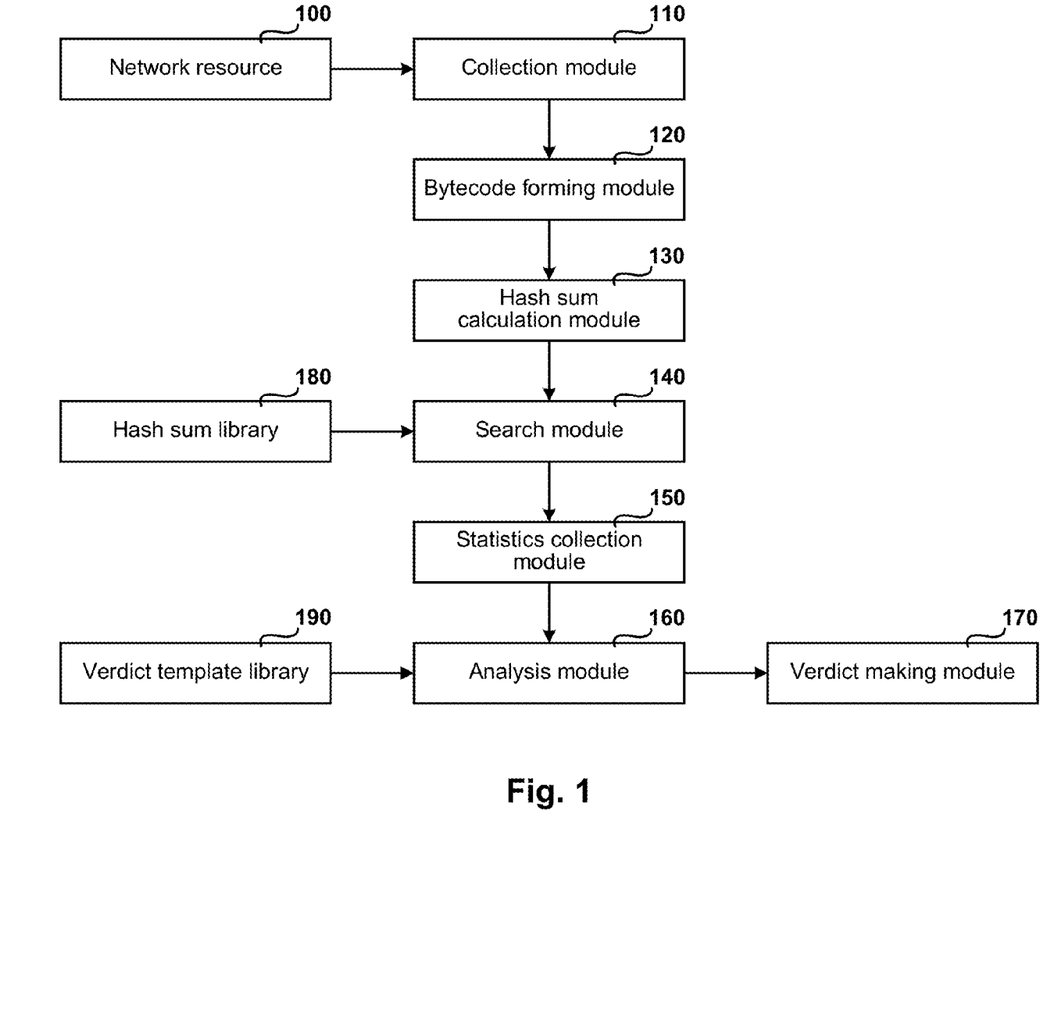
FIG. 1 illustrates a diagram of an exemplary system for detection of phishing scripts.

FIG. 1 shows a diagram of an exemplary aspect of the system for detection of phishing scripts. The system includes a network resource 100, a collection module 110, an bytecode calculating module 120, a hash sum calculation module 130, a search module 140, a statistics collection module 150, an analysis module 160, a verdict making module 170, a hash sum library 180 and a verdict template library 190. The network resource 100 can include, but not limited to: an Internet page; an email; a message from an instant messaging system.

In one exemplary aspect, the collection module 110 is configured to: select at least one script from the network resource 100, containing at least one script; and transmit the selected script to the bytecode calculating module 120. In one exemplary aspect, scripts can be selected from network resources, links to which have been found in other scripts (for example, a JavaScript script can be selected by a link located in another JavaScript script in the form 'document.getElementByld("new_tag").src="new_script.js"').

In one exemplary aspect, the bytecode calculating module 120 is configured to: calculate a bytecode of the selected script, where the bytecode is a set of script commands (opcode), consisting of at least one script command contained in the selected script; and transmit the calculated bytecode to the hash sum calculation module 130.

In one exemplary aspect, the bytecode of the selected script may be calculated as follows:
- a sequence of all script commands is selected from the script;
- some of the script commands not realizing the specified functionality (such as displaying information to the screen, jumping via hyperlinks, loading images, and etc.) are removed from the selected sequence;
- the script commands remaining in the selected sequence are combined into groups of commands containing at least one script command each (for example, a sequence of script commands responsible for displaying information to the screen and loading images can be combined into one group);
- each script command or group of script commands is assigned a unique two-byte value;
- the obtained sequence of two-byte values constitutes the calculated bytecode.

In one exemplary aspect, the hash sum calculation module 130 is configured to: calculate the hash sum of the bytecode calculated; and transmit the calculated hash sum to the search module 140. The hash sum can be calculated at least by: calculating fuzzy hash sums, where the fuzzy hash sum of data constitutes a set of hash sums calculated from different data regions for which a fuzzy hash sum is calculated; and fuzzy searching with indexing, being a technique of finding an element in a set with the use of data structures (elements of Euclidean space, tree space, and so on) enabling one to calculate distances between elements of the set (constituting a hash sum) and perform a rapid search for the element of the set nearest to the element being searched, with a small number of comparisons in any given space.

In one exemplary aspect, the search module 140 is configured to: select from the hash sum library 180 at least one group of hash sums in which at least one hash sum is similar to the calculated hash sum, and the calculated degree of similarity of these hash sums; and transmit the selected group and selected degree of similarity of the hash sums to the statistics collecting module 150. The degree of similarity of hash sums may be calculated by at least: comparing fuzzy hash sums, namely calculating a numerical value characterizing the similarity of the data for which the hash sums were computed; and calculating fuzzy searching metrics with indexing, namely calculating the distance between sought and found elements of a set being searched.

In one exemplary aspect, the statistics collecting module 150 is configured to: calculate the group index for at least one selected group on the basis of a group compactness coefficient, a group trust coefficient, and the degree of similarity of the hash sums obtained from the search module 140, where the group index indicates how much the group trust coefficient depends on the group compactness coefficient; and transmit the determined group index to the analysis module 160.

Figure 3:
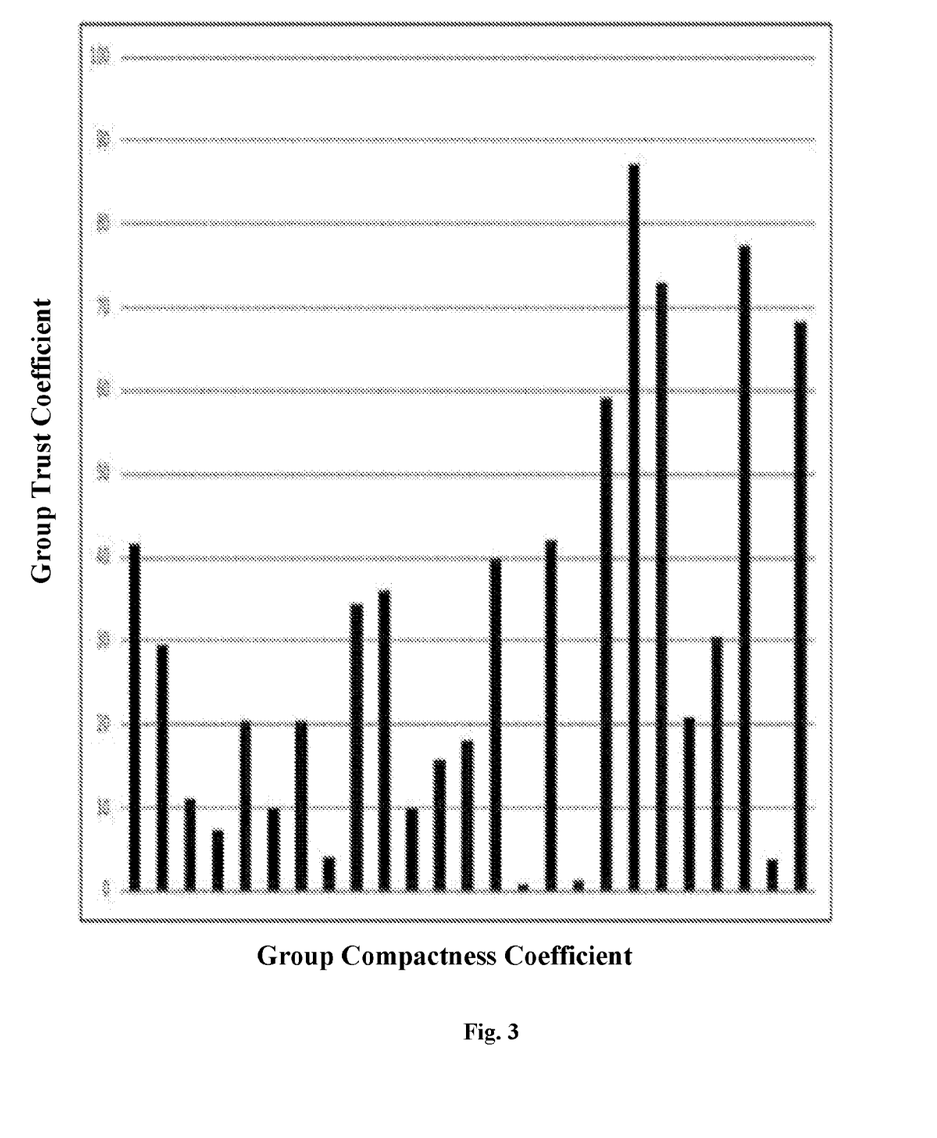
FIG. 3 illustrates a diagram of an example of a plot of the group trust coefficient as a function of the group compactness coefficient.

In one exemplary aspect, the group index can be a pair of numbers {x,y} characterizing an element in the plot of the group trust coefficient as a function of the group compactness coefficient (as is shown in FIG. 3), where the component {x} is the product of the group compactness coefficient and the degree of similarity of the hash sums of the group, and the component {y} is the product of the group trust coefficient and the degree of similarity of the group.

Figure 4:
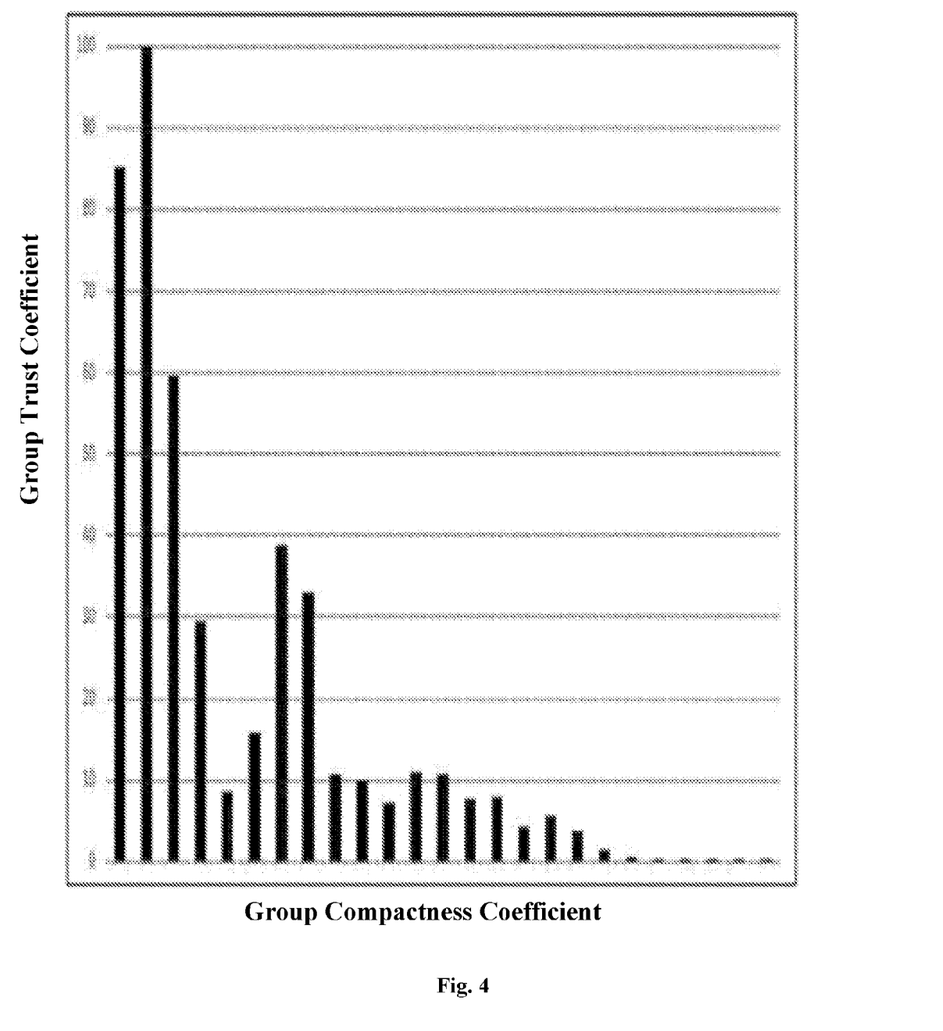
FIG. 4 illustrates a diagram of an example group trust coefficient plotted against the group compactness coefficient after the discrete Fourier transform.

Before the sampling from the verdict template library 190 there can occur a transforming of the group indices determined by the statistics collecting module 150 (as is shown in FIG. 4) by at least: the discrete Fourier transform; the wavelet transform.

As a result of such a transforming, the group indices with a higher group compactness coefficient and a higher group trust coefficient, as being more significant, will be moved to the left side of the function, which should increase the accuracy of the comparison of the determined and the selected sequences for the analysis module 150.

Figure 5:
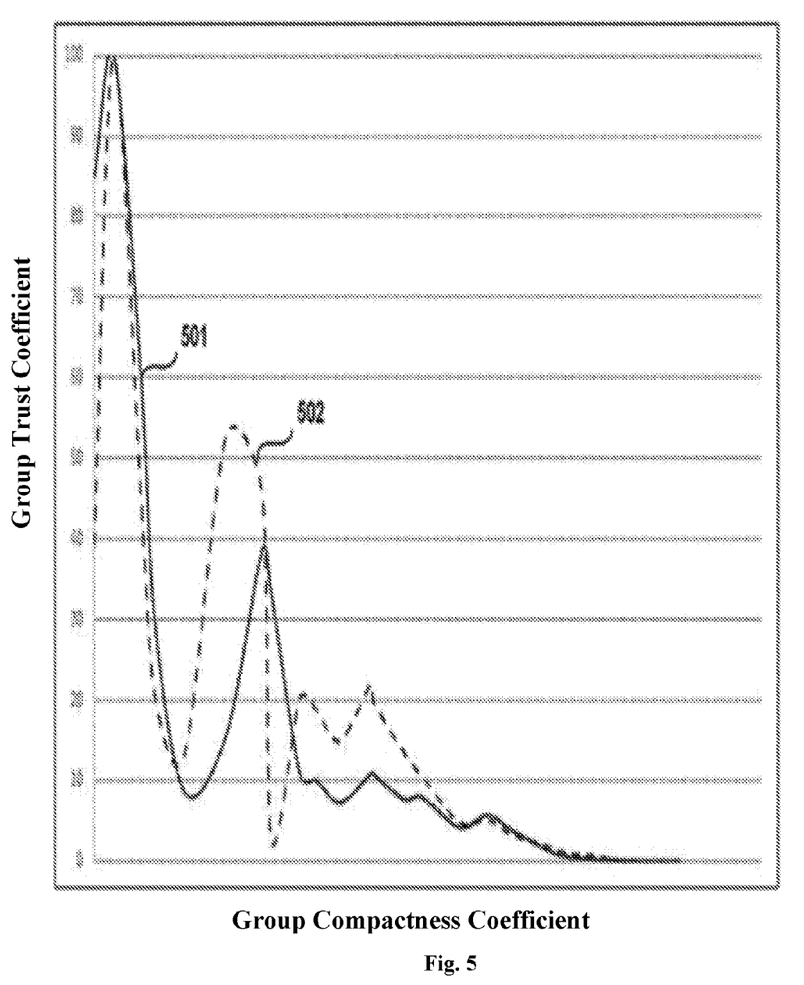
FIG. 5 illustrates a diagram of an example of similarity of two plots of the group trust coefficient as a function of the group compactness coefficient.

In one exemplary aspect, the analysis module 160 is configured to: select from the verdict template library 190 at least one verdict template in which at least one group index is similar to at least one group index as determined by the statistics collecting module 150, and the calculated degree of similarity of these group indices, where the similarity of two group indices is determined by the correspondence of their calculated degree of similarity to an established threshold value; and transmit the selected verdict template and degree of similarity of the group indices to the verdict making module 170;

The degree of similarity of group indices can be calculated by finding the scalar product of multidimensional vectors, where the elements of the multidimensional vectors are the data contained in the group (as is shown in FIG. 5).

In one exemplary aspect, the verdict making module 170 is configured to: make a decision as to whether the script selected by the collection module 110 is a phishing script on the basis of the correspondence of at least one verdict template trust coefficient and at least one degree of similarity of the group indices obtained from the analysis module 160 to an established threshold value. In one exemplary aspect, the making of a decision as to whether the script selected by the collection module 110 is a phishing script may be done as follows: for each pair of verdict template trust coefficient and degree of similarity of group indices obtained, their product is calculated; the least of the obtained products is found and a check is made to see whether it exceeds an established threshold value; and if the above described condition is met, the script selected by the collection module 110 is judged to be a phishing script.

In one exemplary aspect, the hash sum library 180 is configured to: store at least one group being a set of data which includes: at least one hash sum; a group compactness coefficient, indicating how many of the hash sums of the group the calculated hash sum will be similar to, being similar to at least one hash sum of the group, where the similarity of two hash sums is determined by the correspondence of their calculated degree of similarity to an established threshold value; a group trust coefficient, indicating how many scripts used to form the hash sums of the group contain data intended for phishing.

In one exemplary aspect, the group compactness coefficient may be calculated at least by: searching for a minimal degree of similarity among all pairs of hash sums contained in the group; and calculating a measure of central tendency from the degrees of similarity of at least two pairs of hash sums contained in the group.

In one exemplary aspect, the group trust coefficient can be calculated by determining the value in the range from 0, signifying that all of the scripts used to form the hash sums of the given group are phishing scripts, to 1, signifying that all of the scripts used to form the hash sums of the given group are trusted.

The verdict template library 190 is configured to: store at least one verdict template, being a set of data which includes: at least one group index, indicating how much the group trust coefficient depends on the group compactness coefficient; and a verdict template trust coefficient, indicating how many scripts used to form the groups for which the group indices were determined from the verdict template contain data intended for phishing.

In one exemplary aspect, the verdict template trust coefficient can be calculated by determining a value in the range from 0, signifying that all of the scripts used to form the groups for which the group indices were determined from the verdict template are phishing scripts, to 1, signifying that all of the scripts used to form the groups for which the group indices were determined from the verdict template are trusted.

The verdict templates from the verdict template library 190 may collectively encompass the group indices determined by using all the groups from the hash sum library 180.

The following example serves to illustrate how the above-described system works for detection of phishing scripts on the example of the detection of a phishing script contained on the Internet page of the site http://gimmeyourmoney.com, claiming to be a legitimate Internet page of the bank http://gimmeyourmoney.com.

The user directs his browser to the network resource 100, being the Internet page of the site http://gimmeyourmoney.com. An intercept module 110, being a search engine (web crawler), selects from the indicated site scripts which are in some way related to the page being viewed by the user. The scripts selected can be not only scripts contained on the actual page being viewed, but also on pages, links to which are contained on the page being viewed, and transmits the selected scripts to the bytecode calculating module 120.

The bytecode calculating module 120 calculates the bytecode of the intercepted script. For this, a sequence of all script commands is picked out from the selected script; some of the script commands not realizing the specified functionality (such as displaying information to the screen, jumping via hyperlinks, loading images, etc.) are removed from the selected sequence; the script commands remaining in the selected sequence are combined into groups of commands containing at least one script command each (for example, a sequence of script commands responsible for displaying information to the screen and loading images can be combined into one group); each script command or group of script commands is assigned a unique two-byte value; and the obtained sequence of two-byte values constitutes the calculated bytecode.

The hash sum calculation module 130 calculates from the obtained bytecode a fuzzy hash sum (for example, using the open-source algorithm fuzzyHash), being a set of data containing the size of the blocks into which the bytecode is broken up, and the hash sum of these blocks. After this, it transmits the calculated hash sum to the search module 140.

The search module 140 makes a selection of hash sum groups from the hash sum library 180, where a group is a set of data including: previously calculated hash sums of the phishing scripts; a group compactness coefficient, indicating how many of the hash sums of the group the calculated hash sum will be similar to, being similar to at least one hash sum of the group, where the similarity of two hash sums is determined by the correspondence of their calculated degree of similarity to an established threshold value; and a group trust coefficient, indicating how many scripts used to form the hash sums of the group contain data intended for phishing.

In the process of selection from the hash sum library 180, for the hash sums of each group contained in the hash sum library 180 a fuzzy comparison (fuzzy searching) is done with the hash sum obtained from the hash sum calculation module 130. The result of the fuzzy comparison of the two hash sums is a number in the range from 0 to 1, expressing how similar the compared hash sums are to each other and called the degree of similarity of the two hash sums (for example, the similarity of fuzzy hash sums calculated from bytecodes of scripts containing 10% script commands differing from each other will be equal to 0.9). In the event that at least one hash sum of the group being compared has a degree of similarity with the one obtained from the hash sum calculation module 130 above the established threshold (for example, 0.85), it is considered that the group has been found, and the hash sum obtained from the hash sum calculation module 130 belongs to the group being compared. After this, the selected groups and the determined degrees of similarity are sent to the statistics collecting module 150. For the collected scripts from the Internet page of the site http://gimmeyourmoney.com groups were selected containing hash sums of scripts containing the functionality:

for group #1—display of images with parameters used for the display of logotypes (such as that of a bank) (similarity 0.98);

for group #2—transmittal of data from the password entry form to several addresses (similarity 0.95);

for group #3—formation of a structure of an Internet page which is identical to the specified template of the Internet page of banks (similarity 0.90);

for group #4—obfuscation of the code being executed upon pressing the button to send data from the password entry form (similarity 0.87).

The selected groups are sent to the analysis module 160.

The analysis module 160 makes a selection a verdict template from the verdict template library 190 of in which at least one group index is similar to at least one group index determined by the statistics collecting module 150. The similarity of the group indices is determined as follows: each set of group indices, constituting a set of pairs $\{x,y\}$, where $\{x\}$ is the group compactness coefficient, and $\{y\}$ is the group trust coefficient, is taken to be a multidimensional vector V, where the element of the vector is a pair $\{x,y\}$; the scalar product of the two taken vectors is calculated; the calculated scalar product is compared to an established threshold value and if it does not exceed this, the sets of group indices from which the above described vectors were obtained are considered to be similar.

For the group indices obtained from the statistics collecting module 150, the following verdict templates were selected: template #1 "bank disguise": template trust coefficient 0.1, degree of similarity 0.9; and template #2 "registration disguise": template trust coefficient 0.3, degree of similarity 0.8.

The selected verdict templates and degrees of similarity of the group indices are sent to the verdict pronouncing module 170.

The verdict pronouncing module 170 performs the following actions: for each obtained pair of the verdict template trust coefficient and the degree of similarity of the group indices, their product is calculated: template #1 "bank disguise": $0.1 \times 0.9 = 0.09$; template #2 "registration disguise": $0.3 \times 0.8 = 0.24$; the least of the resulting products is found (0.09) and a check is made to see whether it does not exceed the established threshold value (0.15); since the above-described condition is met, the script contained on the Internet page http://gimmeyourmoney.com and selected by the collection module 110 is judged to be a phishing script, as is the Internet page http://gimmeyourmoney.com; after pronouncing the verdict, the user is informed of this.

Since the user has been informed that the Internet page http://gimmeyourmoney.com is a phishing site, he will not give his confidential data to it, that is, he will be protected against the hacking technique of phishing.

Figure 2:
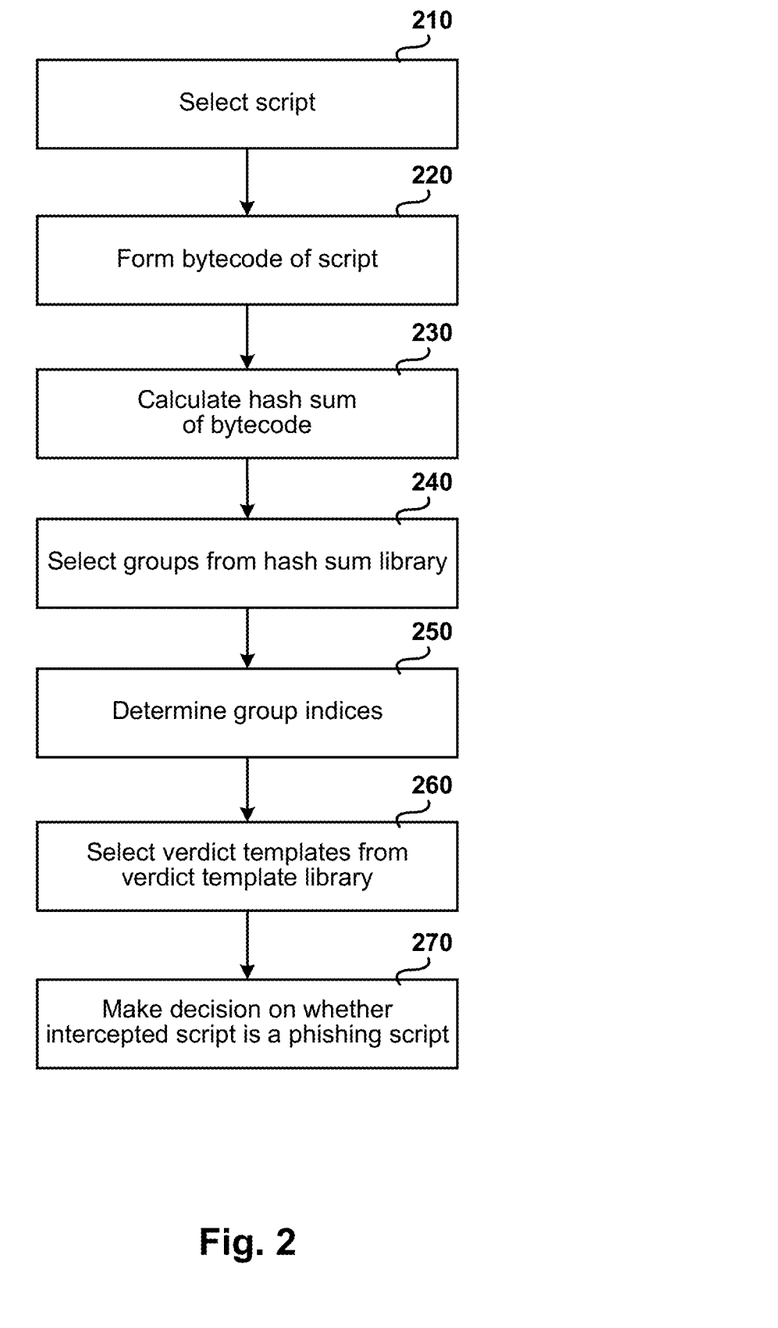
FIG. 2 illustrates a diagram of an exemplary method for detection of phishing scripts.

FIG. 2 illustrates an exemplary method of detection of phishing scripts. In step 210, at least one script is selected from the network resource 100, containing at least one script. In step 220 the bytecode of the selected script is formed, where the bytecode constitutes a set of script commands (opcode), consisting of at least one script command contained in the selected script. In step 230 the hash sum of the formed bytecode is calculated.

In step 240 there is selected from the hash sum library 180 at least one group in which at least one hash sum is similar to the calculated hash sum, where the similarity of two hash sums is determined on the basis of the correspondence of the calculated degree of similarity of the two indicated hash sums with an established threshold value of the hash sum similarity, and the calculated degree of similarity of the two indicated hash sums. The selected group contains: at least one hash sum; a group compactness coefficient, indicating how many of the hash sums of the group the computed hash sum will be similar to, being similar to at least one hash sum of the group, where the similarity of two hash sums is determined on the basis of the correspondence of the computed degree of similarity of the two indicated hash sums to an established threshold value of similarity of hash sums, and a group trust coefficient, indicating how many scripts used to form the hash sums of the group contain data intended for phishing.

In step 250 the group index is determined for at least one selected group on the basis of the group compactness coefficient, the trust coefficient of the groups contained in the group selected in step 240, and the degree of similarity of the hash sums calculated in step 240, the group index indicating how much the group trust coefficient depends on the group compactness coefficient.

In step 260 there is selected from the verdict template library 190 at least one verdict template in which at least one group index is similar to at least one group index as determined in step 250, where the similarity of two group indices is determined on the basis of the correspondence of the calculated degree of similarity of the indicated group indices with an established threshold value of similarity of group indices, and the calculated degree of similarity of these group indices. The selected verdict template contains: at least one group index, indicating how much the group trust coefficient depends on the group compactness coefficient, and a verdict template trust coefficient, indicating how many scripts used to form the groups for which the group indices were determined from the verdict template contain data intended for phishing.

In step 270, a decision is made as to whether the script selected in step 210 is a phishing script on the basis of the correspondence with the established threshold phishing value of at least one verdict template trust coefficient contained in the verdict template selected in step 260 and at least one degree of similarity of group indices as calculated in step 260.

An example below illustrates how the above-described system for detection of phishing scripts works for detection of a phishing script contained in a message received by the user via email, claiming to be a message from the legitimate commercial organization "Worldwide Hardware Goods".

The user directs his mail client (such as Microsoft Outlook) to the network resource 100, being an email server, and receives an email purporting to be from the commercial organization "Worldwide Hardware Goods". In step 210, the intercept module 110, being an email client plug-in module, selects scripts from the received email. The scripts selected might be not only scripts contained in the email itself, but also on Internet pages, links to which are contained in the received email, and the selected scripts are sent to the bytecode forming module 120.

In step 220, the bytecode forming module 120 forms the bytecode of the intercepted script. For this, a sequence of all script commands is picked out from the selected script; some of the script commands not realizing the specified functionality (such as displaying information to the screen, jumping via hyperlinks, loading images, and so forth) are removed from the selected sequence; the script commands remaining in the selected sequence are combined into groups of commands containing at least one script command each (for example, a sequence of script commands responsible for displaying information to the screen and loading images can be combined into one group); each script command or group of script commands is assigned a unique two-byte value; and the obtained sequence of two-byte values constitutes the calculated bytecode.

In step 230 the hash sum calculation module 130 calculates from the received bytecode a fuzzy hash sum (for example, with the help of the open-source algorithm fuzzy-Hash), being a set of data containing the size of the blocks into which the bytecode is broken up, and the hash sums of these blocks. After this, it transmits the calculated hash sum to the search module 140.

In step 240 the search module 140 makes a selection of hash sum groups from the hash sum library 180, where a group constitutes a set of data including: previously calculated hash sums of the phishing scripts; a group compactness coefficient, indicating how many of the hash sums of the group the calculated hash sum will be similar to, being similar to at least one hash sum of the group, where the similarity of two hash sums is determined by the correspondence of their calculated degree of similarity to an established threshold value; a group trust coefficient, indicating how many scripts used to form the hash sums of the group contain data intended for phishing.

In the process of selection from the hash sum library 180, for the hash sums of each group contained in the hash sum library 180 a fuzzy comparison (fuzzy searching) is done with the hash sum obtained in step 230. The result of the fuzzy comparison of the two hash sums is a number in the range from 0 to 1, expressing how similar the compared hash sums are to each other and called the degree of similarity of the two hash sums (for example, the similarity of fuzzy hash sums calculated from bytecodes of scripts containing 10% script commands differing from each other will be equal to 0.9). In the event that at least one hash sum of the group being compared has a degree of similarity with the one obtained in step 230 above the established threshold (for example, 0.85), it is considered that the group has been found, and the hash sum obtained in step 230 belongs to the group being compared. After this, the selected groups and the determined degrees of similarity are sent to the statistics collecting module 150. In step 250, for the selected scripts from the email there were selected groups containing hash sums of scripts containing the functionality:

for group #1—display of images with parameters used for the display of logotypes (such as that of a bank) (similarity 0.9);
for group #2—transmittal of data from the password entry form to several addresses (similarity 0.99);

The data from the selected groups are sent to the analysis module 160.

In step 260 the analysis module 160 makes a selection of a verdict template from the verdict template library 190 in which at least one group index is similar to at least one group index determined in step 250. The similarity of group indices is determined as follows: each set of group indices, constituting a set of pairs {x,y}, where {x} is the group compactness coefficient, and {y} is the group trust coefficient, is taken to be a multidimensional vector V, where the element of the vector is a pair {x,y}; the scalar product of the two taken vectors is calculated; the calculated scalar product is compared to an established threshold value and if it does not exceed this, the sets of group indices from which the above described vectors were obtained are considered to be similar.

For the group indices obtained from the statistics collecting module 150, the following verdict templates were selected: template #1 "registration disguise": template trust coefficient 0.05, degree of similarity 0.97.

The selected verdict templates and degrees of similarity of the group indices are sent to the verdict pronouncing module 170.

In step 270, the verdict pronouncing module 170 performs the following actions: for the obtained pair of the verdict template trust coefficient and the degree of similarity of the group indices, their product is calculated: template #2 "registration disguise": 0.05×0.97=0.0485; a check is made to see whether the obtained value does not exceed the established threshold value (0.1); since the above-described condition is met, the script contained in the email and selected in step 210 is judged to be a phishing script; after pronouncing the verdict, the user is informed of this.

Since the user has been informed that the received email is a phishing email, he will not give his confidential data in it, that is, he will be protected against the hacking technique of phishing.

FIG. 3 shows an example of plot of the group trust coefficient as a function of the group compactness coefficient.

FIG. 4 shows an example of plot of the group trust coefficient as a function of the group compactness coefficient after the discrete Fourier transform.

FIG. 5 shows an example of similarity of two plots of the group trust coefficient as a function of the group compactness coefficient.

Since the plot of the group trust coefficient as a function of the group compactness coefficient can be represented as a discrete signal, as shown in FIG. 3, one can first carry out a discrete Fourier transform of the plot of the group trust coefficient as a function of the group compactness coefficient for a more accurate comparison of the two plots and determination of the degree of similarity, as a result of which the amplitude representation of the signal function will be transformed into a frequency representation, as shown in FIG. 4. Thus, the often used group indices will be assembled closer to the origin of the function, and those used seldom will be assembled further away from the origin of the function and can be removed, since they have little influence on the result of the comparison of the functions.

FIG. 5 shows an example of comparison of a set of group indices 501, forming a plot of the group trust coefficient as a function of the group compactness coefficient as obtained from the statistics collecting module 150, and a set of group indices 502 forming a plot of the group trust coefficient as a function of the group compactness coefficient as obtained from the verdict template library 190.

The comparison may be done as follows: each set of group indices, constituting a set of pairs {x,y}, where {x} is the group compactness coefficient, and {y} is the group trust coefficient, is taken to be a multidimensional vector V, where the element of the vector is a pair {x,y}; the scalar product of the two taken vectors is calculated; the calculated scalar product is compared to an established threshold value and if it does not exceed this, the sets of group indices from which the above-described vectors were obtained are considered to be similar.

Figure 6:
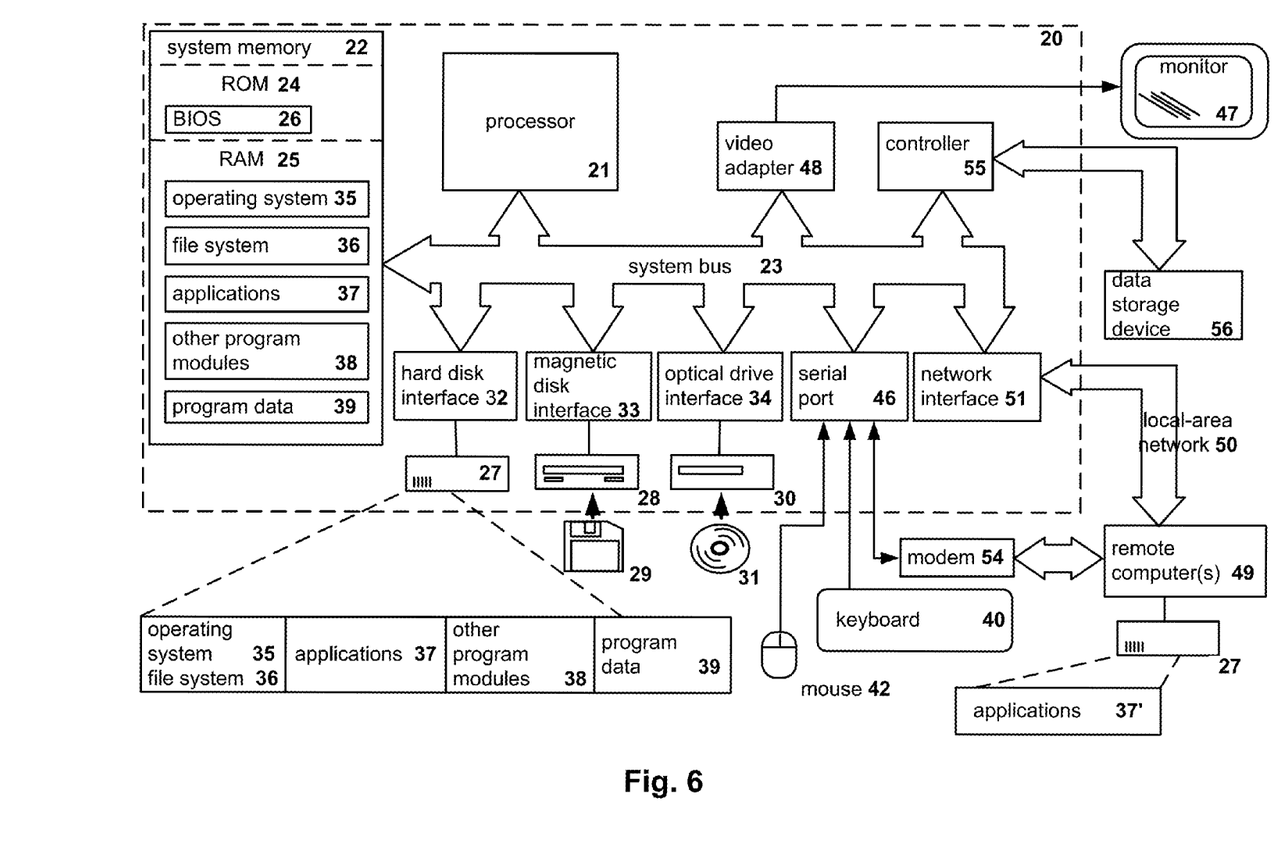
FIG. 6 illustrates an example of a computer system which can be used to implement various aspects of systems and methods of the present invention.

FIG. 6 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detection of phishing scripts, the method comprising:
   identifying, by a processor, in a script, commands responsible for functions of writing of data to disk, working with objects of file system and execution of programs;
   grouping, by processor, the identified script commands into a plurality of functional groups;
   generating, by the processor, a bytecode for each functional group;
   computing, by the processor, a hash sum of the generated bytecode;
   determining, by the processor, a degree of similarity between the hash sum of the bytecode and hash sums in one or more groups of hash sums of known phishing scripts;
   identifying, by the processor, at least one group of hash sums that contains a hash sum whose degree of similarity with the hash sum of the bytecode is within a threshold;
   determining, by the processor, a coefficient of compactness of the identified group of hash sums and a coefficient of trust of the identified group of hash sums; and
   determining, by the processor, whether the script is a phishing script based on the degree of similarity, the coefficient of compactness and the coefficient of trust.

2. The method of claim 1, wherein the bytecode includes at least one opcode of the script.

3. The method of claim 1, wherein generating a bytecode of the script further includes:
   assigning, by the processor, a binary value to each functional group; and
   generating, by the processor, the bytecode from the binary values.

4. The method of claim 1, wherein a hash sum includes a fuzzy hash.

5. The method of claim 1, wherein searching for matching hash sums includes fuzzy searching.

6. The method of claim 1, wherein determining a coefficient of compactness and a coefficient of trust of the identified group of hash sums, further includes: determining an index of the identified group of hash sums, wherein the index indicates how much the coefficient of trust depends on the coefficient of compactness of the identified group of hash sums.

7. A system for detection of phishing scripts, the system comprising:
   a hardware processor configured to:
      identify, in a script, commands responsible for functions of writing of data to disk, working with objects of file system and execution of programs;
      group the identified script commands into a plurality of functional groups;
      generate a bytecode for each functional group;
      compute a hash sum of the generated bytecode;
      determine a degree of similarity between the hash sum of the bytecode and hash sums in one or more groups of hash sums of known phishing scripts;
      identify at least one group of hash sums that contains a hash sum whose degree of similarity with the hash sum of the bytecode is within a threshold;
      determine a coefficient of compactness of the identified group of hash sums and a coefficient of trust of the identified group of hash sums; and
      determine whether the script is a phishing script based on the degree of similarity, the coefficient of compactness and the coefficient of trust.

8. The system of claim 7, wherein the bytecode includes at least one opcode of the script.

9. The system of claim 7, wherein generating a bytecode of the script further includes:
assign a binary value to each functional group; and
generate the bytecode from the binary values.

10. The system of claim 7, wherein a hash sum includes a fuzzy hash.

11. The system of claim 7, wherein searching for matching hash sums includes fuzzy searching.

12. The system of claim 7, wherein determining a coefficient of compactness and a coefficient of trust of the identified group of hash sums, further includes: determining an index of the identified group of hash sums, wherein the index indicates how much the coefficient of trust depends on the coefficient of compactness of the identified group of hash sums.

13. A non-transitory computer readable medium storing computer executable instructions for detection of phishing scripts, including instructions for:
identifying, in a script, commands responsible for functions of writing of data to disk, working with objects of file system and execution of programs;
grouping the identified script commands into a plurality of functional groups;
generating a bytecode for each functional group;
computing a hash sum of the generated bytecode;
determining a degree of similarity between the hash sum of the bytecode and hash sums in one or more groups of hash sums of known phishing scripts;
identifying at least one group of hash sums that contains a hash sum whose degree of similarity with the hash sum of the bytecode is within a threshold;
determining a coefficient of compactness of the identified group of hash sums and a coefficient of trust of the identified group of hash sums; and
determining whether the script is a phishing script based on the degree of similarity, the coefficient of compactness and the coefficient of trust.

14. The non-transitory computer readable medium of claim 13, wherein the bytecode includes at least one opcode of the script.

15. The non-transitory computer readable medium of claim 13, wherein generating a bytecode of the script further includes:
assigning, by the hardware processor, a binary value to each functional group; and
generating, by the hardware processor, the bytecode from the binary values.

16. The non-transitory computer readable medium of claim 13, wherein a hash sum includes a fuzzy hash.

17. The non-transitory computer readable medium of claim 13, wherein searching for matching hash sums includes fuzzy searching.

18. The non-transitory computer readable medium of claim 13, wherein determining a coefficient of compactness and a coefficient of trust of the identified group of hash sums, further includes: determining an index of the identified group of hash sums, wherein the index indicates how much the coefficient of trust depends on the coefficient of compactness of the identified group of hash sums.

* * * * *